United States Patent
Holmberg et al.

(10) Patent No.: US 8,946,917 B2
(45) Date of Patent: Feb. 3, 2015

(54) METHOD FOR CONTROLLING POWER FLOW WITHIN A WIND PARK SYSTEM, CONTROLLER, COMPUTER PROGRAM AND COMPUTER PROGRAM PRODUCTS

(75) Inventors: Per Holmberg, Ludvika (SE); Ying Jiang-Häfner, Ludvika (SE); Lars-Erik Juhlin, Ludvika (SE)

(73) Assignee: ABB Technology AG, Zurich (CH)

( * ) Notice: Subject to any disclaimer, the term of this patent is extended or adjusted under 35 U.S.C. 154(b) by 0 days.

(21) Appl. No.: 14/127,874

(22) PCT Filed: Jun. 20, 2011

(86) PCT No.: PCT/EP2011/060249
§ 371 (c)(1),
(2), (4) Date: Feb. 3, 2014

(87) PCT Pub. No.: WO2012/175110
PCT Pub. Date: Dec. 27, 2012

(65) Prior Publication Data
US 2014/0191507 A1    Jul. 10, 2014

(51) Int. Cl.
F03D 9/00        (2006.01)
H02P 9/04        (2006.01)

(52) U.S. Cl.
USPC ......................................................... 290/44

(58) Field of Classification Search
USPC .............. 290/44, 55, 4 A; 700/286, 287, 288;
322/59; 307/69, 71, 78, 153
See application file for complete search history.

(56) References Cited

U.S. PATENT DOCUMENTS

| | | | |
|---|---|---|---|
| 8,205,106 B2 * | 6/2012 | Boss et al. | 713/320 |
| 2005/0200133 A1 | 9/2005 | Wobben | |
| 2008/0093856 A1 * | 4/2008 | Stiesdal | 290/44 |
| 2010/0094474 A1 | 4/2010 | Larsen et al. | |
| 2010/0308585 A1 | 12/2010 | Jorgensen et al. | |
| 2013/0015663 A1 * | 1/2013 | Kumula et al. | 290/52 |

FOREIGN PATENT DOCUMENTS

| | | | | |
|---|---|---|---|---|
| EP | 1 959 136 A2 | 8/2008 | | |
| EP | 2 238 821 A1 | 10/2010 | | |
| JP | 2005151769 A | * | 6/2005 | H02J 3/38 |
| WO | 03/077398 A2 | 9/2003 | | |
| WO | WO 2010/086031 A2 | 8/2010 | | |
| WO | WO 2010086031 A3 | * | 10/2010 | |

* cited by examiner

*Primary Examiner* — Julio Gonzalez Ramirez
(74) *Attorney, Agent, or Firm* — Birch, Stewart, Kolasch & Birch, LLP

(57) ABSTRACT

A method is provided for controlling power flow within a wind park system for power transmission to a main power grid, the wind park system including two or more parallel-connected island wind park grids. The method includes the steps of: controlling a first voltage source converter as a swing bus in frequency control, the frequency control including controlling frequency to a steady state reference operating point for operating points within a power dead band and by frequency droop control when exceeding an end point of the power dead band, and controlling at least a second voltage source converter in power control, the power control including controlling power flow to a steady state reference operating point for operating points within a frequency dead band and by power droop control when exceeding an end point of the frequency dead band. A controller and computer program product are also provided.

19 Claims, 4 Drawing Sheets

METHOD FOR CONTROLLING POWER FLOW WITHIN A WIND PARK SYSTEM, CONTROLLER, COMPUTER PROGRAM AND COMPUTER PROGRAM PRODUCTS

FIELD OF THE INVENTION

The invention relates generally to the field of wind power generation and control thereof, and in particular control of parallel connected wind park grids.

BACKGROUND OF THE INVENTION

To use wind energy from wind power plants is an attractive although challenging alternative for power generation. One challenge in this regards relates to the location of wind farms, typically being far from a main power grid. The power from the wind parks has to be delivered to the main power grid in an efficient and reliable manner. High Voltage Direct Current (HVDC) transmission for interconnecting e.g. an off-shore wind park to the on-shore main power grid is considered a suitable alternative.

Operation of parallel voltage source converter (VSC) HVDC links feeding the power from the off-shore wind park to the main land may seem very straight forward in that strategies used for operating parallel generators feeding the main power grid could be used. However, there is a significant difference: mechanical inertia.

In the regular case, wherein generators and motors generate and deliver power to the main AC grid, the generator and motor loads provide a significant mechanical inertia. Frequency variations in the main AC grid are therefore smooth.

In contrast, in a large wind park feeding several VSC converters (rectifiers on the off-shore side) there is no mechanical inertial at all. The power output from the wind turbines is transferred via power converters and the VSC converters, which also lack built-in mechanical inertias. The only built-in inertia in the system lies in the capacitances of cables interconnecting the parallel off-shore VSC converters. The cable capacitances prevent sharp steps in phase angle of the parallel off-shore converters.

The converters in the wind park control the frequency and phase angle of their internal source voltage. This entails the risk of instability between control systems of the parallel-connected off-shore VSC converters.

Parallel-connected off-shore wind parks should be controlled so as to ensure stability of power transmission. Conventional power control using frequency droop can be difficult to implement due to the lack of mechanical inertia. In particular, it can be difficult to obtain stability of such system. Further, the varying wind speed gives an varying power generation and the control of the parallel connected VSC converters has to be able to rapidly enable load sharing during overload as well as during loads below capacity.

SUMMARY OF THE INVENTION

An object of the invention is to provide a reliable control of parallel-connected wind parks, yielding fast load sharing both at overload situations as well as during low power generation situations.

The object is according to a first aspect of the invention achieved by a method for controlling power flow within a wind park system for power transmission to a main power grid. The wind park system comprises two or more parallel-connected island wind park grids, each island wind park grid comprising a wind park with at least one wind turbine. The wind park is connected to an AC bus, in turn connected to a voltage source converter arranged to feed power to the main power grid by means of a direct current transmission line. The method comprises the steps of: controlling a first voltage source converter as a swing bus in frequency control, the frequency control comprising controlling frequency to a steady state reference operating point for operating points within a power dead band and by means of frequency droop control when exceeding an end point of the power dead band, and controlling at least a second voltage source converter in power control, the power control comprising controlling power flow to a steady state reference operating point for operating points within a frequency dead band and by means of power droop control when exceeding an end point of the frequency dead band. A reliable and stable control of the power from the wind park system is provided, having a small signal stability as well as being able to handle large disturbances.

In embodiments of the invention, the power dead band comprises a power range defined as steady state operation, the frequency dead band comprises a frequency range defined as steady state operation, the steady state reference operating points being related to a steady state operation of the respective voltage source converter and/or the steady state operation comprising power flow during normal operating conditions including minor failures and load variations.

In an embodiment, all voltage source converters in power control follow the same droop characteristics for load sharing of additional load upon a fault.

In another embodiment, all voltage source converters in power control follow individually set droop characteristics.

In still another embodiment, the method comprises the further step of disconnecting the parallel-connected island wind park grids to islanded wind park grids operated independently upon determining an outage of one of the direct current transmission lines.

In an embodiment, if the first voltage source converter being controlled as a swing bus in frequency control is lost, then the method comprises the further step of changing one of the at least a second voltage source converters being controlled in power control to act as the swing bus in frequency control.

The invention also encompasses controllers for controlling a voltage source converter in power control or frequency control, computer programs and computer program products.

Further features and advantages of the invention will become clear upon reading the following description and the accompanying drawings.

DETAILED DESCRIPTION OF EMBODIMENTS

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail. Like numbers refer to like elements throughout the description.

Figure 1:
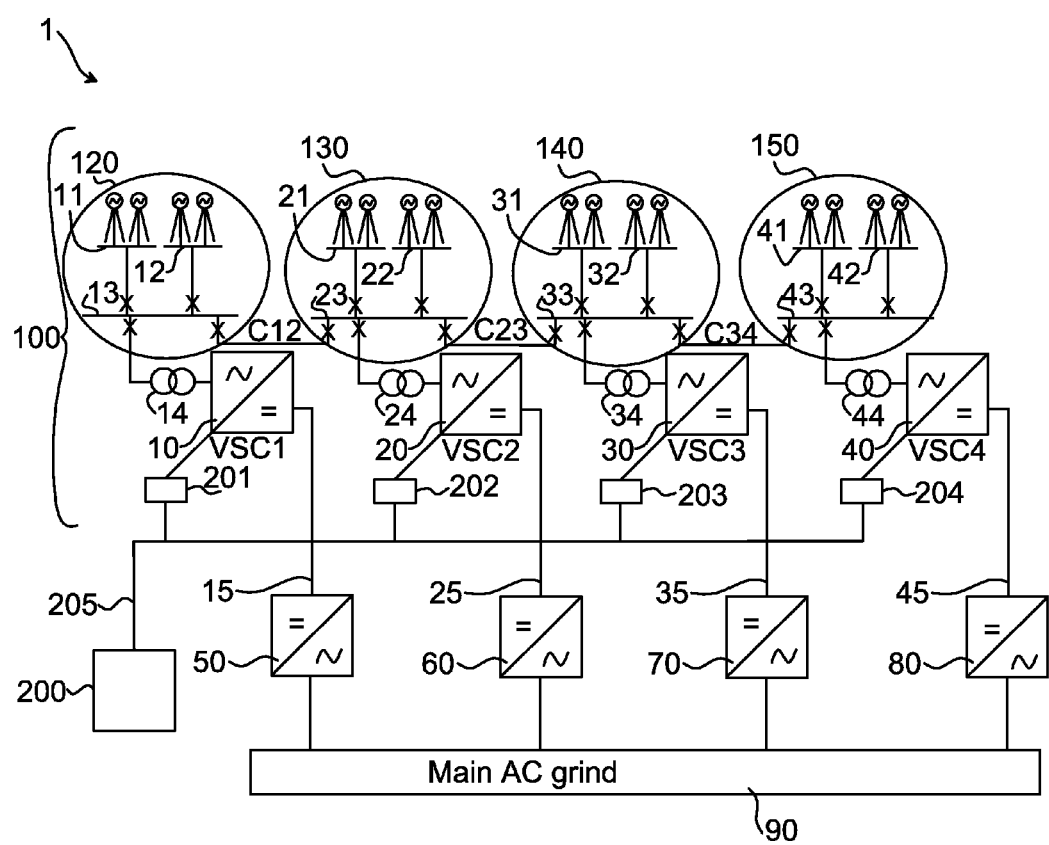
FIG. 1 illustrates schematically an environment in which embodiments of the invention may be implemented.

FIG. 1 illustrates schematically an environment in which embodiments of the invention may be implemented. The maximum power from a large off-shore wind park system 100 is larger than the capability of a single HVDC connection. Therefore, several HVDC links (transmission lines 15, 25, 35, 45) are needed, which may be connected in parallel as illustrated. When having more than one HVDC converter connected to the same wind park system, they are considered parallel operated HVDC links. In particular, a wind power system 1 comprises a number of wind park platforms, in the following denoted wind parks, 11, 12, 21, 22, 31, 32, 41, 42. Each wind park may comprise any number of wind turbines generators. The wind parks 11, 12, 21, 22, 31, 32, 41, 42 are connected in parallel to respective AC buses 13, 23, 33, 43, the AC buses 12, 23, 33, 43 being interconnectable by means of cables C12, C23, C34.

A first wind park 11 and a second wind park 12 are connected in parallel to a first AC bus 13. The first AC bus 13 is connected to a first VSC 10 via a transformer 14. In corresponding manner, wind parks 21, 22 are connected to a second AC bus 23, which is connected to a second VSC 20 via a transformer 24; wind parks 31, 32 are connected to a third AC bus 33, which is connected to a third VSC 30 via a transformer 34; wind parks 41, 42 are connected to a fourth AC bus 43, which is connected to a fourth VSC 40 via a transformer 44.

The wind parks connected to the same AC bus is denoted an island wind park 120, e.g. wind parks 11 and 12 connected to the AC bus 13. One island wind park 120 interconnected by AC cables to another island wind park 130 thus operate in parallel. The wind park system 100 comprises all such island wind parks 120, 130, 140, 150.

The first, second, third and fourth off-shore VSCs 10, 20, 30, 40 are connected in parallel to on-shore VSCs 50, 60, 70 and 80, respectively, via the HVDC transmission lines 15, 25, 35, 45. The on-shore VSCs 50, 60, 70, 80 are connected to the main AC grid 90 on-shore. The on-shore VSCs 50, 60, 70, 80 could alternatively be feeding several different AC grids.

The wind power system 1 comprises a number of conventional circuit breakers as well, for enabling disconnection of different parts thereof, e.g. at faults. Such circuit breakers are illustrated as crosses at exemplifying locations. For example, a circuit breaker should be provided for enabling the disconnection of a wind park from the respective AC buses. As another example, circuit breaker(s) should be provided in cables (preferably at both ends thereof) interconnecting an island wind park with another island wind park for enabling disconnection thereof.

The wind power system 1 may comprise further components, not illustrated. For example, DC choppers are preferably connected to the on-shore VSCs 50, 60, 70 and 80 for providing a security if the main AC grid 90 cannot, for some reason, receive further power from the wind park system 100.

Figure 2:
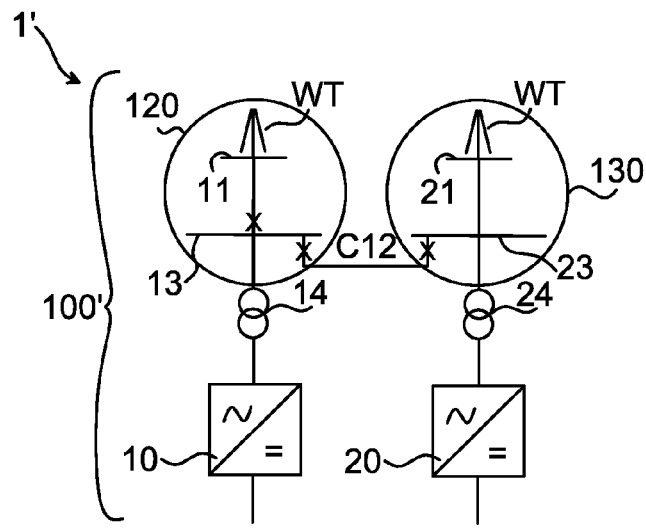
FIG. 2 illustrates schematically the environment illustrated in FIG. 1 in its basic configuration.

FIG. 2 illustrates schematically an environment similar to the one illustrated in FIG. 1. In particular, FIG. 2 illustrates the wind power system 1 of FIG. 1 in the most basic embodiment with only two island wind parks 120, 130 interconnectable by a cable C12. Using the same reference numerals where applicable, the wind power system 1' in FIG. 2 comprises a wind park system 100' comprising only two wind parks 11, 21, each comprising one or more wind turbines WT. The wind parks 11, 21 are connected to the respective AC bus 13, 23, which in turn are connected in parallel to the respective VSC 10, 20 via transformers 14, 24.

Figure 3:
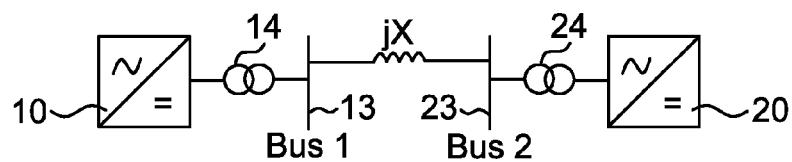
FIG. 3 illustrates AC voltage control for two AC busses.

FIG. 3 illustrates AC voltage control for two AC busses. The voltage of one AC bus cannot be controlled by two control systems unless there is a reactive power droop applied. For parallel generators the voltage is often compounded to a point inside the generator, thus with a reactance between the common AC bus and the point of voltage control. From a system point of view, this is equivalent to a droop control of the AC voltage. If the reactance jX between the VSCs 10, 20 has a certain value, the first VSC 10 can control the AC voltage of AC bus 13, and the second VSC 20 can control the AC voltage of AC bus 23 more or less independently of each other. If the reactance jX is small, droop control has to be applied or one VSC has to be in reactive power control. On the other hand, if jX is large, the bus voltage of each AC bus 13, 23 must be controlled.

Figure 4:
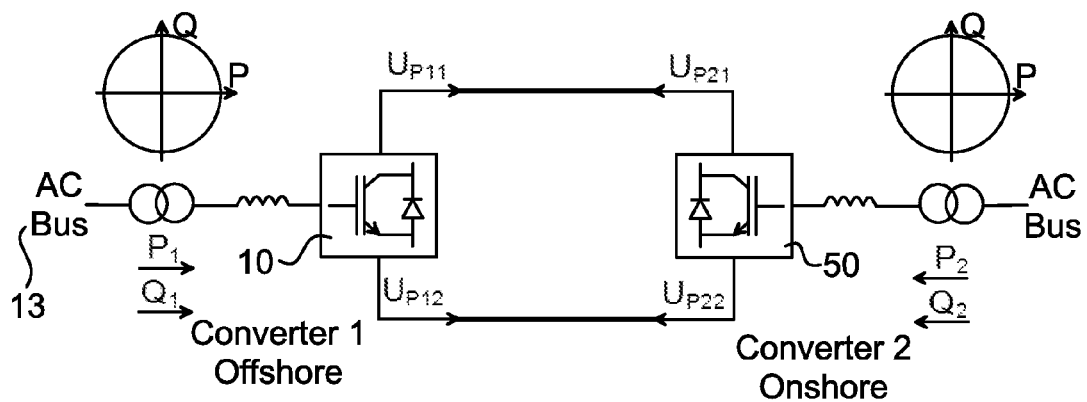
FIG. 4 defines direction of active and reactive power.

FIG. 4 illustrates an off-shore converter, e.g. VSC 10, and an on-shore converter, e.g. VSC 50. The directions of reactive and active power $P_1$, $Q_1$, $P_2$, $Q_2$ are defined in the figure, and will be referred to in the following, for example when providing equations.

There are several modes of operation for controlling a VSC, a few of which will be mentioned briefly below.

A VSC in a normal AC voltage control, adjusts its internal voltage and tap changer position until the AC voltage is equal to a set reference value in accordance with $$U_{AC} = U_{ACref} + \text{droop}_Q * (Q - Q_{ref}) \quad (1)$$

where $U_{AC}$ is the converter AC voltage, $U_{ACref}$ is the AC voltage reference, $\text{droop}_Q$ is the reactive power droop constant, Q is the converter reactive power as defined in FIG. 4, and $Q_{ref}$ is a setpoint reference for the droop control, which normally is always equal to zero. The reference values $U_{ACref}$, $Q_{ref}$ are given by a dispatch or a wind park master control.

In an AC voltage control without droop, the VSC adjusts its internal voltage and the tap changer position until the AC voltage $U_{AC}$ is equal to the set reference value $U_{ACref}$.

In a reactive power control, the VSC adjusts its internal voltage and the tap changer position until the reactive power exchange is equal to the set reference value $Q_{ref}$.

Referring again to FIG. 1, at high wind, with all off-shore VSCs 10, 20, 30, 40 in operation, a preferred mode of operation is to disconnect all AC buses 13, 23, 33, 43 from each other by opening up all cable connections C12, C23 and C34 (by means of circuit breakers). Each DC link, i.e. from off-shore VSC (e.g. VSC 10) to on-shore VSC (e.g. VSC 50), is thus operated independently, whereby the risk of tripping the whole wind power system 1 in case of outage of one DC link 15, 25, 35, 35 is avoided. The off-shore VSCs are thus in islanded operation, which has advantages, for example in that faults within one wind park will not affect power production of the other wind parks, and that the control of a single VSC is less complex than when involving several VSCs in parallel and controlling them.

However, at low DC load or when a DC link is out of operation, parallel operation of the VSCs may be used, and the total power from e.g. two island wind parks 120, 130 can be transmitted by one HVDC link 15. That is, interconnecting suitably chosen AC buses 13, 23, 33, 43 by corresponding cable connections C12, C23 and C34. In parallel operation, it is necessary to coordinate the control of the off-shore VSCs 10, 20, 30, 40. A control coordination in accordance with embodiments of the invention comprises selecting proper control modes for each VSC. In particular, one VSC is designated to control its frequency and voltage and the remaining VSCs are in active and reactive power control.

Wind turbines are arranged to decrease their power output if the frequencies of the AC network (AC buses 13, 23, 33, 43) increase. However, such control is not very fast. Therefore, in a short time scale (ms time scale) the wind turbine generator power output is constant, regardless of frequency variations of the AC network. The consequence is, for the case of parallel operation of the DC links 15, 25, 35, 35, that if the total power from the connected wind parks 11, 12, 21, 22, 31, 32, 41, 42 is higher than a short term power capability of the remaining VSCs in case of a DC link outage, also the remaining VSCs will be tripped due to overload. DC choppers of the VSCs will not be able to remedy such situation, as the VSCs are overloaded in this case.

Another critical aspect is that the frequency control of an islanded part (one or more island wind parks 120, 130, 140, 150) of the wind power system 1 must not be lost if a VSC or a connection cable is tripped, as long as at least one VSC is connected to the islanded system.

In view of the above critical aspects, embodiments of the invention provide two basic control modes: frequency control and active power control, which can be combined in different ways as will be described next.

As there is no inertia in the wind park system 100, the frequency control does not involve any frequency regulator. Instead the VSC controls the frequency of its source voltage to be same as the frequency reference value. However, there is also a droop compensation for the active power. This can be expressed as:

$$f_{VSC} = f_{ref} + \text{droop}_P * (P - P_{ref}) \quad (2)$$

where $f_{VSC}$ is the frequency of the VSC source voltage, $f_{ref}$ is the frequency reference or the frequency order, $\text{droop}_P$ is a droop constant, P is the actual VSC AC side active power, $P_{ref}$ is the power reference or power order from dispatch.

The droop may be set to zero, for example in the case for a VSC acting as a swing bus.

In an active power control the VSC adjusts the phase angle of its source voltage until the active power P is equal to the power reference $P_{ref}$ or the power order, regardless of the frequency.

In case that a VSC reaches its current limitation due to any power order to operate above its capability, the control is changed to constant current with the maximum current as a maximum reference. The excessive wind power generation has to be taken by the other parallel connected VSCs, if it is within their capability.

If the total generation by the wind park system 100 is above the total power capability of the parallel connected VSCs 10, 20, 30, 40, the frequency and voltage of the AC network will increase until the unbalanced power is forced into the HVDC links 15, 25, 35, 35 via freewheeling diodes of the VSCs 10, 20, 30, 40. The consequence of this will be that all HVDC links 15, 25, 35, 35 are tripped due to overload. The VSC control cannot prevent the overload in such case. Thus, it must be ensured that the generation of power from the wind park system 100 does not exceed the capability of the parallel connected converters, also in case of a single contingency disturbance.

If the power order decreases below the capability limit of the VSC, the VSC returns to above-described previous mode of operation.

As has been described, in accordance with the invention, only one VSC controls the voltage and frequency, the other VSCs control the power. The VSC controlling the voltage and frequency acts as a swing bus, i.e. the transmitted power on the HVDC link connected to this VSC will automatically be equal to the total power from the wind park system 100 minus the dispatched power on the other VSCs. If the dispatched power is not changed and the total wind power generation is increasing or decreasing due to wind speed change, then the power to the VSC in voltage and frequency control will automatically increase or decrease.

Figure 5:
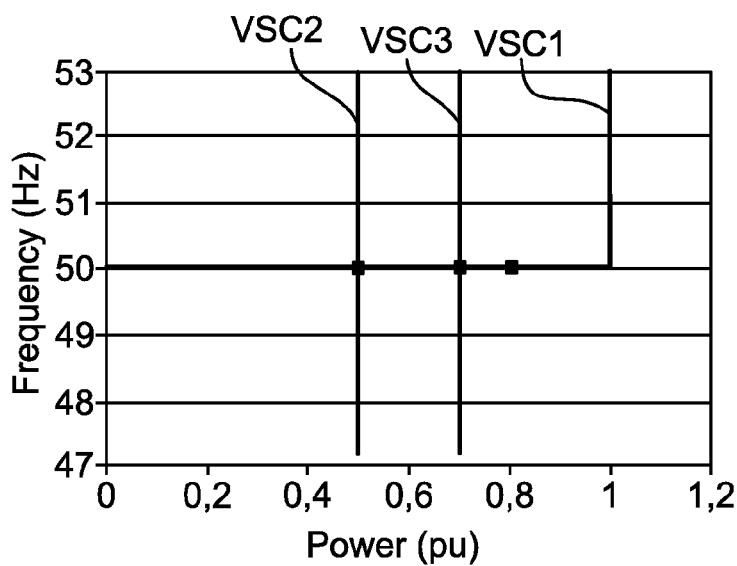
FIG. 5 illustrates characteristics of one VSC being in frequency control and the remaining VSCs in power control.

Referring to FIG. 5, if a first converter VSC1 is operated as such swing bus, i.e. balancing the power within the system, and the remaining converters VSC2, VSC3 are operated in constant active power control, the power of the first converter VSC1 depends on the power balance between the wind park system 100 and the converters VSC2, VSC3 in power control. FIG. 5 illustrates characteristics of this situation, wherein a first converter VSC1 acts as a swing bus and the second converter VSC2 and third converter VSC3 are in power control mode. As an example, the total power in the case of FIG. 5 is 2.0 p.u., which can be handled by the second converter VSC2 and third converter VSC3. However, if any of the second converter VSC2 or third converter VSC3 trips, then the first converter VSC1 would go to overload limitation. If the other converters do not take the unbalanced power in a controlled way, it is likely that the first converter VSC1 is tripped due to overload followed by loss of even the other converters.

If the first converter VSC1 is lost, the frequency control is lost. It is then very unlikely that the remaining system will survive.

In case that a connection between the first converter VSC1 and the second converter VSC2 trips (e.g. connection C12 between VSC 10 and VSC 20 of FIG. 1), operation of the first converter VSC1 will continue with available power. However, the island comprising the second converter VSC2 and the third converter VSC3 will have no frequency control. Thus, the operation characteristics illustrated in FIG. 5 would work during an undisturbed operation, but the consequence of a major disturbance would not be acceptable. From the above it is realized that it must be ensured that one of the off-shore converters in the remaining HVDC links is in frequency control.

Figure 6:
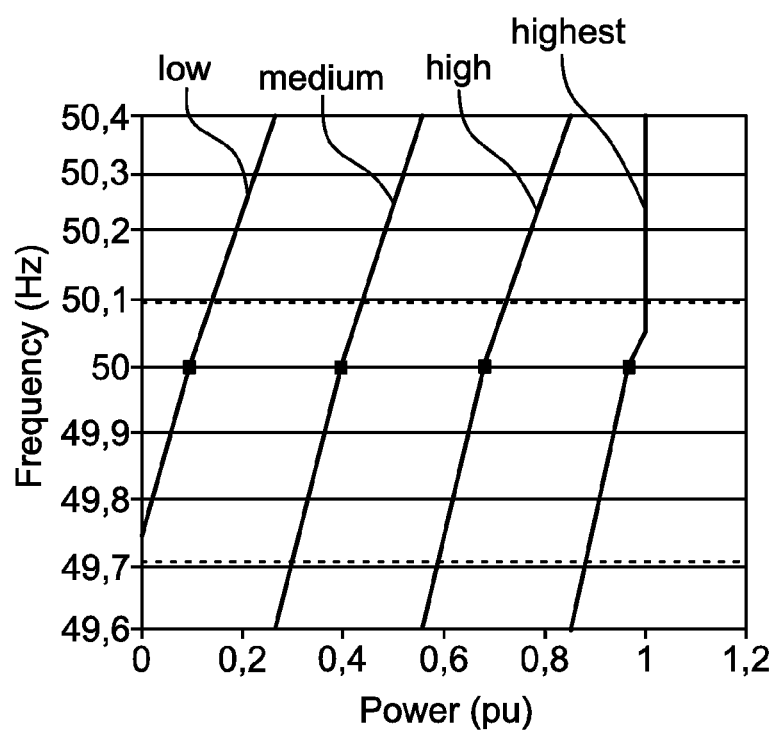
FIG. 6 illustrates characteristics for operation in frequency control with droop.

To operate all parallel DC links in frequency control with the same droop constant is much more robust against disturbances. This is illustrated in FIG. 6. The three parallel lines show frequency/power characteristics for different levels of total wind power (low, medium, high). All parallel connected converters have the same power and frequency references, as indicated by the small squares. In Europe for example, this would be 50 Hz. The frequency references are thus changed for all converters in accordance with the total load, all converters obtaining a power order and controlling their power output accordingly.

The principle is that the small short-term variations in wind power are taken up by the frequency variations within the normal frequency band, in the illustrated case 49.7 to 50.1 Hz. However, for larger variations in wind power, the dispatch has to adjust the power orders to the converters for keeping the short term frequency variations within the normal frequency band, for example 49.5 to 50.1 Hz. For frequencies above 50.1 Hz, the power output from the wind park system 100 is reduced. Similarly, operation down to 49.5 Hz is allowed.

If one converter trips the remaining converters take up the load while increasing the frequency. As the frequency is likely to rise above 50.1 Hz, the power production will be temporarily reduced (wind turbine generator speed reduced). This situation is rectified by an adjustment of power order from the dispatch controller. However, if the total generation of wind power is above the capability of the remaining converters, all converters will be lost, as the power adjustment of the wind power generation is slow.

In FIG. 6, the rightmost curve, denoted "highest", illustrates the changed characteristics if the capability of the converters is reached (the vertical line of FIG. 6 illustrating the limitation of the converter). The dispatch strategy should be to ensure a sufficient margin to this breaking point, as there would else be a significant risk of tripping the entire system.

If a HVDC connection is lost, all resulting island wind park grids will still have proper frequency control, if the total amount of wind power in the respective island is within the capability of the islanded converters.

Due to the lack of mechanical inertia, the operation as described above with reference to FIG. 6 may not give sufficient small signal stability. Even if it would be possible to tune the controls of the VSCs to stability, there may be initial problems, for example due to different characteristics of equipment being delivered by different providers.

From the above it is clear that there are many considerations to make when operating parallel converters. In accordance with the invention, one converter acts as a swing bus in frequency control and the remaining converters are in power control. Further, in view of the earlier mentioned small signal stability issues, dead bands are used in steady state operation and droop control is used for larger disturbances, which will be described next.

Figure 7:
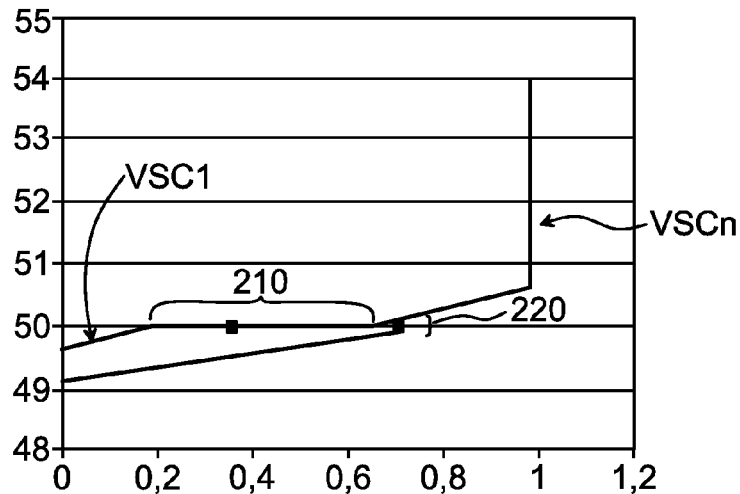
FIG. 7 illustrates characteristics of one VSC in frequency control and the remaining VSCs in power control with dead band.

FIG. 7 illustrates a frequency (y-axis) and power (x-axis) diagram for a first converter VSC1 acting as a swing bus in frequency control and remaining converters VSCn being in power control. In order to provide stability, the constant active power control of the converters VSCn in power control is provided with a frequency dead band 220. The swing bus converter (first converter VSC1) is provided with a power dead band 210.

The first converter VSC1 controls its frequency f to a frequency reference $f_{ref}$ and the other converters VSCn control their power to a power reference. The small squares of FIG. 7 indicate the operating points of the converters. As long as the operating point of the first converter VSC1 is within the power dead band 210, the first converter VSC1 controls its frequency to the reference frequency. That is, the power is allowed to vary and still be considered to be within normal operation (steady state operation) within the power dead band 210 of the first converter VSC1. As long as the operating point of the remaining converters VSCn are within the frequency dead band 220, the remaining converters VSCn control their power to the reference power. The use of dead bands ensures small signal stability.

As described earlier, the frequency cannot be allowed to vary too much (keeping the short term frequency variations within the normal frequency band), the frequency dead band being for example 49.7 to 50.1 Hz or 49.5 to 50.1 Hz.

In case of a sudden load increase, e.g. at trip of one converter, all converters VSCn in power control follow the same droop characteristics for best load sharing of the additional load (refer to FIG. 6). That is, in an embodiment, all converters VSCn have the same droop constant.

In FIG. 7, the sloping parts of the characteristics for the converters VSCn in power control illustrates droop characteristics for these converters. It is noted that the first sloping part corresponds to a droop constant different than a droop constant of the second sloping part. A master control then dispatches new power orders to the power controlled converters VSCn and the operation reverts to the described operation with dead bands.

During such load increase, the power controlled converters VSCn are thus controlled in accordance with $$P_i = P_{ref} + d_i(f - f_{ref}) \tag{3}$$

Although the same droop constant is illustrated for all power controlled converters VSCn, the droop constant $d_i$ may be set individually for the power controlled converters VSCn.

Figure 8:
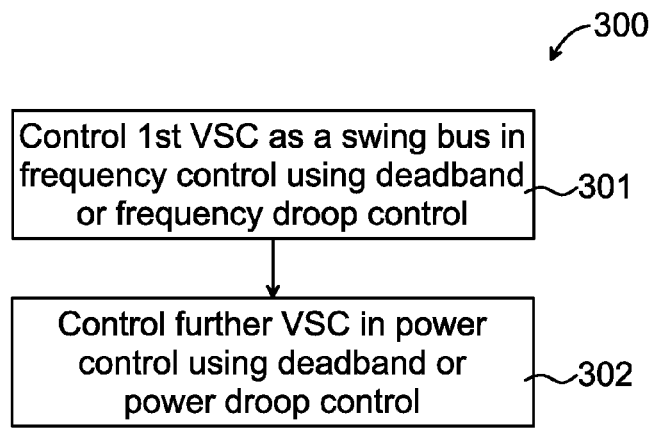
FIG. 8 illustrates a flow chart over steps of a method in accordance with an aspect of the invention.

FIG. 8 is a flow chart of steps of a method in accordance with an embodiment of the invention. The method 300 enables the control of power flow within the wind park system 100 for power transmission to the main power grid 90. The wind park system 100 comprises two or more of the described parallel-connected island wind parks 120, 130, 140, 150 as described earlier.

The method 300 comprises the first step of controlling 301 a first voltage source converter 10 as a swing bus in frequency control, the frequency control comprising controlling frequency to a steady state reference operating point for operating points within a power dead band 210 and by means of frequency droop control when exceeding an end point of the power dead band 210.

The method 300 comprises the second step of controlling 302 at least a second voltage source converter 20, 30, 40 in power control, the power control comprising controlling power flow to a steady state reference operating point for operating points within a frequency dead band 220 and by means of power droop control when exceeding an end point of the frequency dead band 220.

The power dead band 210 may comprise a power range defined as steady state operation and the frequency dead band 220 may comprise a frequency range defined as steady state operation.

The steady state reference operating points are preferably related to a steady state operation of the respective voltage source converter 10, 20, 30, 40, the steady state operation comprising power flow during normal operating conditions including minor failures and load variations.

In an embodiment, all voltage source converters 20, 30, 40 that are in power control follow the same droop characteristics for load sharing of additional load upon a fault. This provides a very good load sharing of load from a voltage source converter e.g. being faulty.

In another embodiment, all voltage source converters 20, 30, 40 in power control follow individually set droop characteristics.

In an embodiment, the method 300 comprises the further step of disconnecting the parallel-connected island wind park grids 120, 130, 140, 150 to islanded wind park grids 120, 130, 140, 150 that are operated independently upon determining an outage of one of the HVDC transmission lines 15, 25, 35, 45. Operating and controlling the island wind park grids 120, 130, 140, 150 independently have advantages as described earlier. For example, loss of one HVDC transmission line 15, 25, 35, 45 will not affect the power generation and transmission to on-shore from the wind park system 100 even at high load levels, nor will faults within one island wind park grid affect power production of the other island wind park grids.

In an embodiment, if is detected that the first voltage source converter 10 that is being controlled as a swing bus in frequency control is lost, then the method comprises the further step of changing one of the other voltage source converters 20, 30, 40 that are being controlled in power control to act as the swing bus in frequency control. Thereby it is ensured that even if the first converter VSC1 is lost, the frequency control is not lost. Thereby the remaining system has higher chances of surviving. This mode change can for example be implemented by a master control being arranged to perform such mode change. Alternatively, one of the VSCs in power mode is arranged to change mode upon a certain criteria, e.g. over frequencies occurring.

Referring again to FIG. 1, control of the VSCs 10, 20, 30, 40 can be implemented by means of a wind park system controller 200 sending power orders to VSC controllers 201, 202, 203, 204 controlling a respective VSC 10, 20, 30, 40. The wind park system controller 200 and the VSC controllers 201, 202, 203, 204 may be general purpose computers comprising appropriate software instructions enabling the desired control function. The wind park system controller 200 and the VSC controllers 201, 202, 203, 204 are interconnected by a suitable communication network 205 in order to exchange data. The communication network 205 may for example be a telecommunication network or a wide area network such as the Internet.

The method as described can be implemented in controllers controlling the VSCs 10, 20, 30, 40.

Figures 9, 10:
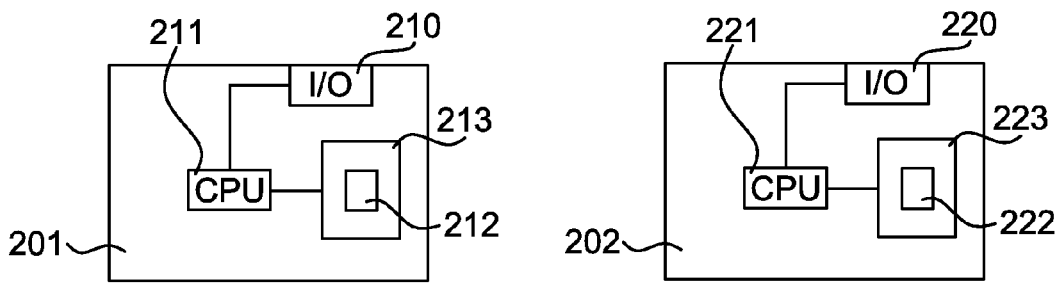
FIG. 9 illustrates a controller for controlling a VSC acting as swing bus and being in frequency control.
FIG. 10 illustrates a controller for controlling a VSC in power control.

FIG. 9 illustrates a controller 201 for controlling the VSC 10 acting as swing bus and being in frequency control. The controller comprises a processor 211, e.g. a central processing unit, microcontroller, digital signal processor (DSP), etc., capable of executing software instructions stored in a computer program product 213 e.g. in the form of a memory. The processor 211 is connected to an input/output device 210 for sending and receiving data over the communication network 205. It is noted that although only one processor 211 is illustrated in FIG. 9, the implementation may comprise distributed hardware so that several CPUs are used rather than one when running the software.

The described method or parts thereof for controlling power flow of the VSC 10 may be implemented e.g. by software and/or application specific integrated circuits in the processor 211. To this end, the controller 201 may further comprise a computer program 212 stored on the computer program product 213.

With reference still to FIG. 9, the invention also encompasses such computer program 212 for controlling power flow of the VSC 10. The computer program 212 comprises computer program code which when run on the controller 201, and in particular the processor 211 thereof, causes the controller 201 to perform the methods as described.

A computer program product 213 is also provided comprising the computer program 212 and computer readable means on which the computer program 212 is stored. The computer program product 213 can be any combination of read and write memory (RAM) or read only memory (ROM). The computer program product 213 may also comprise persistent storage, which, for example can be any single one or combination of magnetic memory, optical memory, or solid state memory.

FIG. 10 illustrates a controller 202 for controlling a VSC 20, 30, 40 in power control. The controller 202 comprises a processor 221, e.g. a central processing unit, microcontroller, digital signal processor (DSP), etc., capable of executing software instructions stored in a computer program product 223 e.g. in the form of a memory. The processor 221 is connected to an input/output device 220 for sending and receiving data over the communication network 205.

It is noted that although only one processor 221 is illustrated in FIG. 10, the implementation may comprise distributed hardware so that several CPUs are used rather than one when running the software.

The described method or parts thereof for controlling power flow of the VSC 20, 30, 40 may be implemented e.g. by software and/or application specific integrated circuits in the processor 221. To this end, the controller 202 may further comprise a computer program 222 stored on the computer program product 223.

With reference still to FIG. 10, the invention also encompasses such computer program 222 for controlling power flow of the VSC 20, 30, 40. The computer program 222 comprises computer program code which when run on the controller 202, and in particular the processor 221 thereof, causes the controller 202 to perform the methods as described.

A computer program product 223 is also provided comprising the computer program 222 and computer readable means on which the computer program 222 is stored. The computer program product 223 can be any combination of read and write memory (RAM) or read only memory (ROM). The computer program product 223 may also comprise persistent storage, which, for example can be any single one or combination of magnetic memory, optical memory, or solid state memory.

The invention claimed is:

1. A method for controlling power flow within a wind park system for power transmission to a main power grid, the wind park system comprising two or more parallel-connected island wind park grids, each island wind park grid comprising a wind park with at least one wind turbine, the wind park being connected to an AC bus, in turn connected to a voltage source converter arranged to feed power to the main power grid by means of a direct current transmission line, the method comprising the steps of:
controlling a first voltage source converter as a swing bus in frequency control, the frequency control comprising controlling frequency to a steady state reference operating point for operating points within a power dead band and by means of frequency droop control when exceeding an end point of the power dead band, and
controlling at least a second voltage source converter in power control, the power control comprising controlling power flow to a steady state reference operating point for operating points within a frequency dead band and by means of power droop control when exceeding an end point of the frequency dead band.

2. The method as claimed in claim 1, wherein the power dead band comprises a power range defined as steady state operation.

3. The method as claimed in claim 1, wherein the frequency dead band comprises a frequency range defined as steady state operation.

4. The method as claimed in claim 1, wherein the steady state reference operating points are related to a steady state operation of the respective voltage source converter.

5. The method as claimed in claim 2, wherein the steady state operation comprises power flow during normal operating conditions including minor failures and load variations.

6. The method as claimed in claim 1, wherein all voltage source converters in power control follow the same droop characteristics for load sharing of additional load upon a fault.

7. The method as claimed in claim 1, wherein all voltage source converters in power control follow individually set droop characteristics.

8. The method as claimed in claim 1, comprising the further step of disconnecting the parallel-connected island wind park grids to islanded wind park grids operated independently upon determining an outage of one of the direct current transmission lines.

9. The method as claimed in claim 1, wherein if the first voltage source converter being controlled as a swing bus in frequency control is lost, then changing one of the at least a second voltage source converters being controlled in power control to act as the swing bus in frequency control.

10. The method as claimed in claim 2, wherein the frequency dead band comprises a frequency range defined as steady state operation.

11. The method as claimed in claim 2, wherein the steady state reference operating points are related to a steady state operation of the respective voltage source converter.

12. The method as claimed in claim 3, wherein the steady state reference operating points are related to a steady state operation of the respective voltage source converter.

13. The method as claimed in claim 3, wherein the steady state operation comprises power flow during normal operating conditions including minor failures and load variations.

14. The method as claimed in claim 4, wherein the steady state operation comprises power flow during normal operating conditions including minor failures and load variations.

15. The method as claimed in claim 2, wherein all voltage source converters in power control follow the same droop characteristics for load sharing of additional load upon a fault.

16. The method as claimed in claim 3, wherein all voltage source converters in power control follow the same droop characteristics for load sharing of additional load upon a fault.

17. The method as claimed in claim 4, wherein all voltage source converters in power control follow the same droop characteristics for load sharing of additional load upon a fault.

18. A controller for controlling a voltage source converter in power control or frequency control, the controller comprising:
   an input device for receiving reference operating points,
   a processor arranged to execute software instructions of a computer program stored in a computer program product the computer program comprising computer program code which when run on the controller, causes the controller to perform the method as claimed in claim 1.

19. A computer program product embodied in a non-transitory computer readable medium for controlling power flow within a wind park system for power transmission to a main power grid, the wind park system comprising two or more parallel-connected island wind park grids, each island wind park grid comprising a wind park with at least one wind turbine, the wind park being connected to an AC bus, in turn connected to a voltage source converter arranged to feed power to the main power grid by means of a respective direct current transmission line, the computer program product comprising computer program code, which, when run on a controller, causes the controller to perform the steps of:
   controlling a first voltage source converter as a swing bus in frequency control, the frequency control comprising controlling frequency to a steady state reference operating point for operating points within a power dead band and by means of frequency droop control when exceeding an end point of the power dead band, and
   controlling at least a second voltage source converter in power control, the power control comprising controlling power flow to a steady state reference operating point for operating points within a frequency dead band and by means of power droop control when exceeding an end point of the frequency dead band.

* * * * *